(12) United States Patent
Vaught

(10) Patent No.: US 8,504,674 B2
(45) Date of Patent: *Aug. 6, 2013

(54) SYSTEM AND METHOD FOR HIGH-PERFORMANCE PROFILING OF APPLICATION EVENTS

(75) Inventor: Jeffrey A. Vaught, Batavia, OH (US)

(73) Assignee: CA, Inc., Islandia, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/153,630

(22) Filed: Jun. 6, 2011

(65) Prior Publication Data
US 2011/0238812 A1    Sep. 29, 2011

Related U.S. Application Data

(63) Continuation of application No. 10/886,756, filed on Jul. 7, 2004, now Pat. No. 7,984,129.

(60) Provisional application No. 60/486,601, filed on Jul. 11, 2003.

(51) Int. Cl.
G06F 15/16    (2006.01)

(52) U.S. Cl.
USPC ............ 709/223; 709/224; 709/225; 709/226

(58) Field of Classification Search
USPC .................. 709/223–226; 707/600–605
See application file for complete search history.

(56) References Cited

U.S. PATENT DOCUMENTS

| | | | |
|---|---|---|---|
| 4,866,599 A | 9/1989 | Morganti et al. | 726/17 |
| 5,003,458 A | 3/1991 | Yamaguchi et al. | 710/260 |
| 5,682,328 A * | 10/1997 | Roeber et al. | 702/187 |
| 6,049,666 A | 4/2000 | Bennett et al. | 717/130 |
| 6,182,244 B1 | 1/2001 | Bankemper et al. | 714/38.1 |
| 6,308,324 B1 | 10/2001 | Roediger et al. | 717/158 |
| 6,345,295 B1 | 2/2002 | Beardsley et al. | 709/224 |
| 6,367,036 B1 | 4/2002 | Hansen | 714/45 |
| 6,728,949 B1 | 4/2004 | Bryant et al. | 717/127 |
| 6,735,758 B1 | 5/2004 | Berry et al. | 717/130 |
| 6,751,789 B1 | 6/2004 | Berry et al. | 717/130 |
| 6,754,890 B1 * | 6/2004 | Berry et al. | 717/128 |
| 6,975,595 B2 * | 12/2005 | Peterson | 370/252 |
| 6,993,246 B1 | 1/2006 | Pan et al. | 386/201 |
| 2002/0174385 A1 | 11/2002 | Cofler et al. | 714/38.1 |
| 2003/0046029 A1 * | 3/2003 | Wiener et al. | 702/186 |
| 2003/0225768 A1 | 12/2003 | Chaudhuri et al. | 1/1 |
| 2004/0064685 A1 | 4/2004 | Nguyen et al. | 712/227 |
| 2004/0210877 A1 * | 10/2004 | Sluiman et al. | 717/130 |

(Continued)

OTHER PUBLICATIONS

Harkema, "Performance Monitoring of Java Applications", Proceedings on the Third International Workshop on Software and Performance, Jul. 24-26, 2002, 114-127.*

(Continued)

Primary Examiner — Djenane Bayard
(74) Attorney, Agent, or Firm — Pillsbury Winthrop Shaw Pittman LLP

(57) ABSTRACT

A system and method for high-performance profiling of web-enabled application events are provided. In one embodiment, the method includes registering a profiler as a provider to an event tracer. Information associated with an event is captured using the profiler, the event is associated with a web-enabled application. A function token is associated with the captured information, which is communicated to the event tracer.

21 Claims, 2 Drawing Sheets

U.S. PATENT DOCUMENTS

2005/0002399 A1* 1/2005 Peterson ............... 370/392
2005/0010930 A1   1/2005 Vaught ................ 719/318
2005/0160431 A1* 7/2005 Srivastava et al. ...... 719/313

OTHER PUBLICATIONS

International Search Report issued in PCT/US2004/021774, mailed Feb. 21, 2005, 6 pages.

European Patent Application No. 04756737.5, Communication Pursuant to Article 94(3) EPC mailed Feb. 12, 2010, 5 pages.

Ball, Thomas, et al, "Optimally Profiling and Tracing Programs", *ACM Transactions on Programming Languages and Systems*, vol. 16, No. 3, Jul. 1994, pp. 1319-1360, 1 page cover sheet and pp. 1-38.

Pierek, Matt, "The .NET Profiling API and the DNProfiler Tool", *MSDN Magazine* [online], Dec. 2001 [retrieved on Feb. 1, 2005]; retrieved from the internet: URL:http://msdn.microsoft.com/msdnmag/issues/01/12/hood/; pp. 1-9.

Harkema, M., et al., "Performance Monitoring of Java Applications", *Proceedings on the Third International Workshop on Software and Performance*, Jul. 26, 2002, pp. 114-127.

Tunstall, Craig, et al., "Developing WMI Solutions—A Guide to Windows Management Instrumentation", Addison-Wesley, Boston, Massachusetts, Nov. 2002, 60 pages.

Tunstall, Craig, et al., "Developing WMI Solutions—A Guide to Windows Management Instrumentation", Addison-Wesley, Boston, Massachusetts, Nov. 2002, pp. 1, 48, 49, and 72-80.

* cited by examiner

SYSTEM AND METHOD FOR HIGH-PERFORMANCE PROFILING OF APPLICATION EVENTS

CROSS-REFERENCE TO RELATED APPLICATIONS

This application is a continuation of U.S. patent application Ser. No. 10/886,756, entitled "System and Method for High-Performance Profiling of Application Events," filed Jul. 7, 2004, which issued as U.S. Pat. No. 7,984,129 on Jul. 19, 2011, and which claims the benefit of U.S. Provisional Patent Application Ser. No. 60/486,601, entitled "System and Method for Reduced. Processing by a Profiler," filed Jul. 11, 2003, the contents of which are hereby incorporated by reference in their entirety.

TECHNICAL FIELD

This disclosure relates generally to the field of event processing and, more specifically, to high-performance profiling of application events.

BACKGROUND

Microsoft's .NET application is software that includes the .NET Framework, which is typically used for developing and running network-based or web-enabled applications and web services. These applications often operate over a network through standard, platform-independent protocols including, for example, Extensible Markup Language (XML), Simple Object Access Protocol (SOAP), and Hypertext Transfer Protocol (HTTP). The .NET Framework includes the common language runtime (CLR), which assists memory, process, and thread management. The CLR Profiler is one profiling tool for .NET-compatible applications. This and other profilers may provide notification of .NET framework events such as, for example, assembly load started, assembly load ended, method started, and method ended. These conventional profilers can become overloaded or suffer performance degradation, such as in the range of ten to one hundred times slower, in a production environment when large numbers of classes and methods get loaded, invoked, or otherwise processed.

SUMMARY

A system and method for high-performance profiling of web-enabled application events are provided. In one embodiment, the method includes registering a profiler as a provider to an event tracer. Information associated with an event is captured using the profiler, where the event is associated with a web-enabled application. A function token is associated with the captured information, which is then communicated to the event tracer. The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
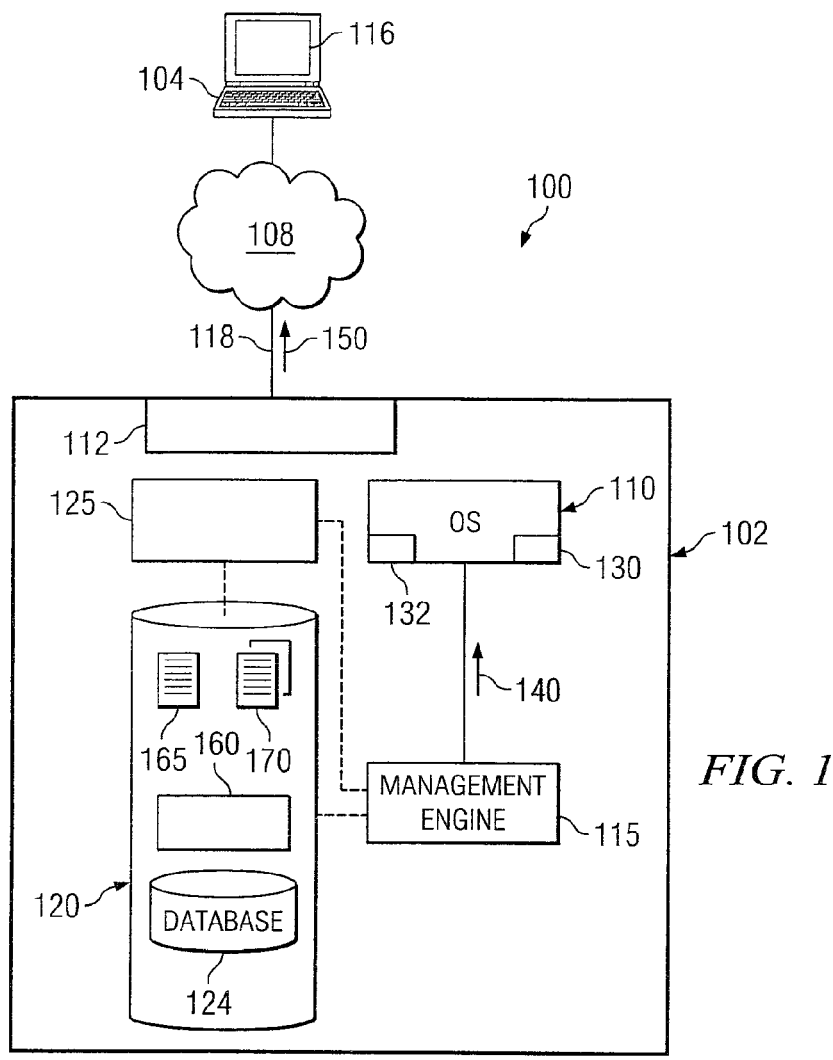
FIG. 1 illustrates a system for high-performance profiling of application events according to certain embodiments of the disclosure.

FIG. 1 illustrates a system for high-performance profiling of application events in a network framework according to certain embodiments of the disclosure. At the outset, it will be understood that "high-performance" describes any suitable processing operable to be (but not necessarily) run in a production or live environment. At a high level, system 100 is a client/server environment comprising at least one client or management workstation 104, a server or host 102, and network 108, but may also be a standard or local computing environment or any other suitable environment. In general, system 100 allows a developer or another process to efficiently profile web-enabled applications in a production environment, often through offloading standard profiling processing to components that minimize effects in a production environment. For example, system 100 may comprise an environment automatically providing one or more users with the ability to easily manage or view and generating or determining information useful for profiling web-enabled applications 160 and associated metrics 140. The term "automatically," as used herein, generally means that the appropriate processing is substantially performed by at least part of system 100. It should be understood that "automatically" further contemplates any suitable user or administrator interaction with system 100 without departing from the scope of this disclosure. The term "dynamically," as used herein, generally means that certain processing is determined, at least in part, at run-time based on one or more variables.

Server 102 includes memory 120 and processor 125 and comprises an electronic computing device operable to receive, transmit, process and store data associated with system 100. Server 102 may comprise a general-purpose personal computer (PC), a Macintosh, a workstation, a Unix-based computer, a server, or any other suitable device. For example, server 102 may be a blade server or a web server. In short, server 102 may comprise software and/or hardware in any combination suitable to gather application events 140. FIG. 1 only provides one example of computers that may be used with the disclosure. For example, although FIG. 1 provides one example of server 102 that may be used with the disclosure, system 100 can be implemented using computers other than servers, as well as a server pool. The present disclosure contemplates computers other than general purpose computers as well as computers without conventional operating systems. In other words, as used in this document, the term "computer" is intended to encompass any suitable processing device. Computer server 102 may be adapted to execute any operating system 110 including Windows NT, Windows 2000, Windows Server, Windows Storage Server, Windows XP home or professional, or any other suitable operating system including, referencing, or linking to an extensible instrumentation layer 130 and an event tracer 132. In one embodiment, operating system 110 includes a network framework, such as Microsoft's .NET framework.

Extensible instrumentation layer 130 exposes namespaces, classes, methods, and properties for hardware devices, operating system 110, and various applications 160. For example, extensible instrumentation layer 130 may be Windows Management Instrumentation (WMI). Event tracer 132 is any module operable to provide (at least substantially) commonly available abilities to issue and format tracing events. Event tracer 132 may be controlled by tracelog functions including StartTrace( ), EndTrace( ), and UpdateTrace( ), as well as others. For example, event tracer 132 may log or write and suitable information or data associated with an event, such as the time of the event, a process ID under which the event occurs, thread ID under which the event occurs, a user-mode CPU time, and/or kernel-mode CPU time. Event tracer 132 may log this or other custom information (such as function ID, class ID, URLs, and context IDs) to event tracing log 170, which is typically stored in memory 120.

Memory 120 may include any hard drive, memory, or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes database 124, at least one web-enabled application 160, administration profile 165, and one or more event tracing logs 170, but may also include any other appropriate data. Database 124 stores one or more database tables, with each table including one or more columns. Database 124 may receive records, schemas, or any other suitable data through interface 112 or from another process running on server 102. In one embodiment, database 124 may be a relational database management system (or DBMS). Relational databases often use sets of schemas to describe the tables, columns, and relationships between the tables using basic principles known in the field of database design. But while described as a relational database, database 124 may be any data repository of any suitable format including XML documents, flat files, Btrieve files, comma-separated-value (CSV) files, an object oriented database, name-value pairs, and others.

Applications 160 include any standard or custom .NET-enabled or web-enabled software (including ASP.NET applications, remoting applications, and particular web services) associated with a network framework, such as Microsoft's .NET framework. Each application 160 may be written or developed in any appropriate language such as C, C++, C#, Java, J#, and VB.NET. To assist an administrator or a developer, memory 120 includes or references administration profile 165, which is operable to present customizable criteria to management engine 115 based, typically, on user input. For example, administration profile 165 may include a plurality of criteria including which assemblies, classes, or methods to profile or log. Administration profile 165 may be in any suitable format including text, encoded, XML, tagged, and others so long as profile 165 remains operable to provide system 100 with customizable processing and logging using event tracing log 170.

Memory 120 also stores one or more event tracing logs 170. Each event tracing log 170 may be an XML document, a binary file, a text file, a CSV file, an object, an array, or any logical or physical component operable to store information associated with an event from application 160 or operating system 110. Indeed, event tracing log 170 may include a plurality of entries (or records), with each entry associated with one event. For example, event tracing log 170 may include a first entry associated with a start event and a second correlated entry associated with an end event. Further, it will be understood that event tracing log 170 may be local or remote, as well as temporary or persistent, without departing from the scope of the disclosure.

Figure 2:
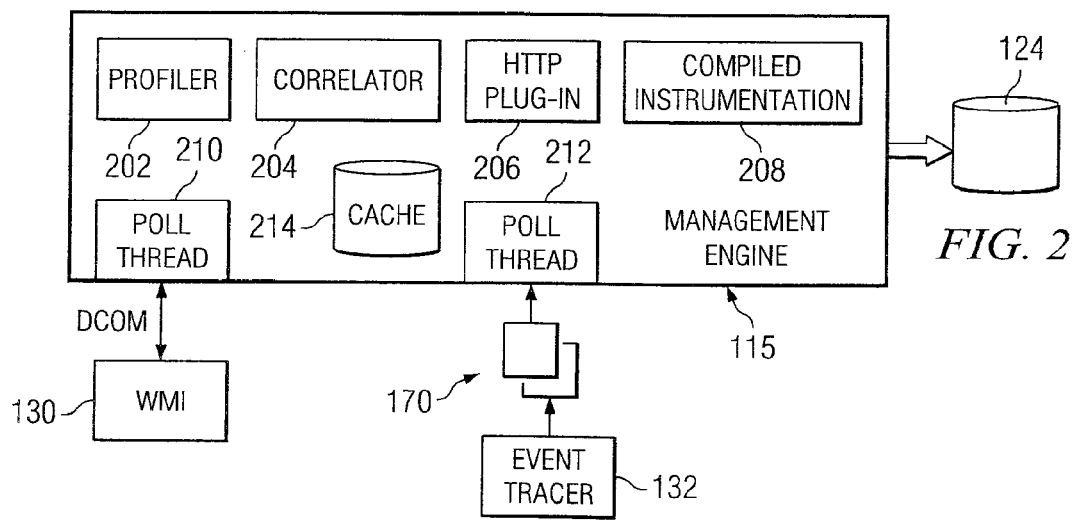
FIG. 2 illustrates a data flow diagram using an example embodiment of the management engine illustrated in FIG. 1.

Server 102 also includes processor 125. Processor 125 executes instructions and manipulates data to perform the operations of server 102 such as, for example, a central processing unit (CPU), an application specific integrated circuit (ASIC) or a field-programmable gate array (FPGA). Although FIG. 1 illustrates a single processor 125 in server 102, multiple processors 125 may be used according to particular needs, and reference to processor 125 is meant to include multiple processors 125 where applicable. In the embodiment illustrated, processor 125 executes management engine 115 that is operable to perform reduced-processing profiling of applications 160. Management engine 115 could include any hardware, software, firmware, or combination thereof operable to receive or retrieve metrics from extensible instrumentation layer 130 (such as WMI), efficient profile production application 160, log profiler or framework events, and allow an administrator or a developer to customize the profiled assemblies, classes, and methods using administration profile 165. For example, management engine 115 may provide client 104 with profile views 150 (such as histograms, graphs, timelines, and others), data displays 150, reports 150, or management interfaces 150 operable to view and manipulate the stored events. It will be understood that while management engine 115 is illustrated as a single multi-tasked module, the features and functionality performed by this engine may be performed by multiple modules such as, for example, a profiler module, a correlator module, and a reference module such as illustrated in FIG. 2. Moreover, while not illustrated, management engine 115 may be a child or sub-module of any other appropriate software module such as, for example, an enterprise infrastructure management application without departing from the scope of this disclosure.

Server 102 also often includes interface 112 for communicating with other computer systems, such as client 104, over network 108 in a client-server or other distributed environment via link 118. Network 108 facilitates wireless or wireline communication between computer server 102 and any other computer. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 112 comprises logic encoded in software and/or hardware in a suitable combination and operable to communicate with network 108. More specifically, interface 112 may comprise software supporting one or more communications protocols associated with communications network 108 or hardware operable to communicate physical signals.

Client 104 comprises any computer and may include input devices, output devices, mass storage media, processors, memory, interfaces, communication ports, or other appropriate components for receiving commands from and present data to the user of client 104. It will be understood that there may be any number of clients 104 coupled to server 102 or client 104 may comprise a management component of server 102. As used in this document, client 104 is intended to encompass a personal computer, workstation, network computer, kiosk, wireless data port, personal data assistant (PDA), one or more processors within these or other devices, or any other suitable processing or display device or software. Moreover, "client 104" and "user of client 104" may be used interchangeably without departing from the scope of this disclosure. For example, client 104 may comprise a computer that includes an input device, such as a keypad, touch screen, mouse, or other device that can accept information, and an output device that conveys information associated with the operation of server 102 or clients 104, including digital data, visual information, or metrics 140. Both the input device and output device may include fixed or removable storage media such as a magnetic computer disk, CD-ROM, or other suitable media to both receive input from and provide output to users of clients 104 through a portion of the output device, namely graphical user interface (GUI) 116.

GUI 116 comprises a graphical user interface operable to allow the user of client 104 to interface with system 100 and view the output of a plurality of software products and application 160. Generally, GUI 116 provides the user of client 104 with an efficient and user-friendly presentation of data provided by system 100, such as a display or report based on profiled applications 160. GUI 116 may comprise a plurality of displays having interactive fields, pull-down lists, and buttons operated by the user. In one example, GUI 116 presents formatted output to and receives commands from client 104. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in system 100 and efficiently presents the information to the user. Server 102 can accept data from client 104 via the web browser (e.g., Microsoft Internet Explorer or Netscape Navigator) and return the appropriate HTML or Extensible Markup Language (XML) responses. For example, GUI 116 may comprise a front-end of management engine 115, with the front-end operable to view profiled events or customize administration profile 165. Accordingly, for ease of understanding, the term GUI 116 and management engine 115 may be used interchangeably; although, it will be understood that management engine 115 will often include more functionality than a graphical user interface.

In one aspect of operation, management engine 115 identifies a web-enabled or .NET-compatible application 160 for profiling. It will be understood that this identification may be in response to a user request, dynamically based on system parameters, or automatically in response to a system request. In certain embodiments, application 160 resides or is executed in a production environment. Management engine 115 profiles or otherwise supervises application 160, typically in an attempt to determine response times and heap activity. As described above, in an effort to minimize performance degradation, management engine 115 attempts to offload at least a portion of standard profiler processing. For example, management engine 115 utilizes event tracer 132 to perform log in operations. Further, management engine 115 may reference or load administration profile 165, thereby allowing a developer or administrator to select various assemblies, classes, methods, and other components of application 160 to profile. Management engine 115 may communicate information associated with non-selected components to a cache prior to calling expensive profiler functions. Management engine 115 may also offload class and method lookups in correlation of start and end events. For example, typical profiler callbacks return a function ID. Management engine 115 would log this function ID using event tracer 132 and associate a function name with the function ID at a later time. In another example, management engine 115 might blindly log both start and end events prior to performing any analysis. Once logged, management engine 115 may correlate each end event with its corresponding start event, thereby reducing the impact on various .NET processes.

FIG. 2 is data flow diagram including an example embodiment of management engine 115 generally illustrated in FIG. 1. At a high level, FIG. 2 illustrates the flow of information between management engine 115, database 124, example WMI 130, and event tracer 132. In this embodiment, management engine 115 includes profiler 202, correlator 204, HTTP plug-in 206, compiled instrumentation 208, poll thread 210, and poll thread 212. While illustrated as internal to management engine 115; it will be understood that each of these components may individually or collectively be a callable remote function, a service, a dynamic-linked library (DLL), a daemon, a Component Object Model (COM) function, or any other local or remote function, method, object, or sub-module.. Moreover, the functionality of these various components may be executed by one component without departing from the scope of the disclosure.

Profiler 202 generally implements profiler techniques and algorithms such as callbacks and providing a user with in-depth instrumentation involving web-enabled application 160. For example, profiler 202 may be a COM server that implements callbacks such as class load started," "class load finished," "function entered," "function leave," and many others. In certain embodiments, these callbacks are instrumented using event tracer 132. Profiler 202 may include a profile mask operable to identify or determine active profiler functions. Profiler 202 may include a thread that listens for a "profiler notification" message operable to instruct profiler 202 to reload a configuration file and reset the mask based on this reload. Moreover, profiler 202 may be registered or coded as a provider, or a source of information associated with an event, with event tracer 132. Correlator 204 is an example component operable to i) collect, gather, or combine one or more event tracing logs 170; ii) correlate start and end events included in event tracing logs 170; iii) chargeback functions; and iv) generate database-compliant data structures based on event tracing logs 170. Correlator 204 may be further operable to identify and process individual records or entries in event tracing log 170 to perform function name processing and/or to efficiently correlate the start/end events. As described above, correlator 204 may be implemented as a plurality of plug-ins or DLLs without departing from the scope of this disclosure.

HTTP plug-in or module 206 is operable to monitor, track, or otherwise process ASP.NET and web services. HTTP module is further operable to intercept requests, messages, or responses between client 104 and server 102 (or an associated web-based environment). For example, HTTP module 206 may implement an IHttpModule interface and present "OnBeginRequest" and "OnEndRequest" functions and may be enabled by an <httpModules>tag. In another example, HTTP plug-in 206 may intercept incoming and outgoing communications to determine any suitable metric or event such as, for example, response time, client identity, response code, or number of requests. In one embodiment, HTTP plug-in 206 may be further operable to monitor Transmission Control Protocol (TCP) requests. Compiled instrumentation 208 is any component operable to easily instrument or manage internal applications or new .NET applications. For example, compiled instrumentation may comprise a plug-in compiled directly into an application such as management engine 115. Poll thread 210 is any plug-in or sub-module operable to poll WMI 130 for certain metrics such as, for example, number of compilations, number of sessions, number of applications, and many others. Typically, these metrics are converted to database-compliant data structures and inserted in to database 124. Poll thread 212 is any plug-in or sub-module operable to locate, identify, or otherwise retrieve or process event tracing logs 170. Poll thread 212 may be further operable to perform a "tracelog -update -f" function to change the name of one of the logs 170, run a trace format against an old file, and delete the old file.

Figure 3A:
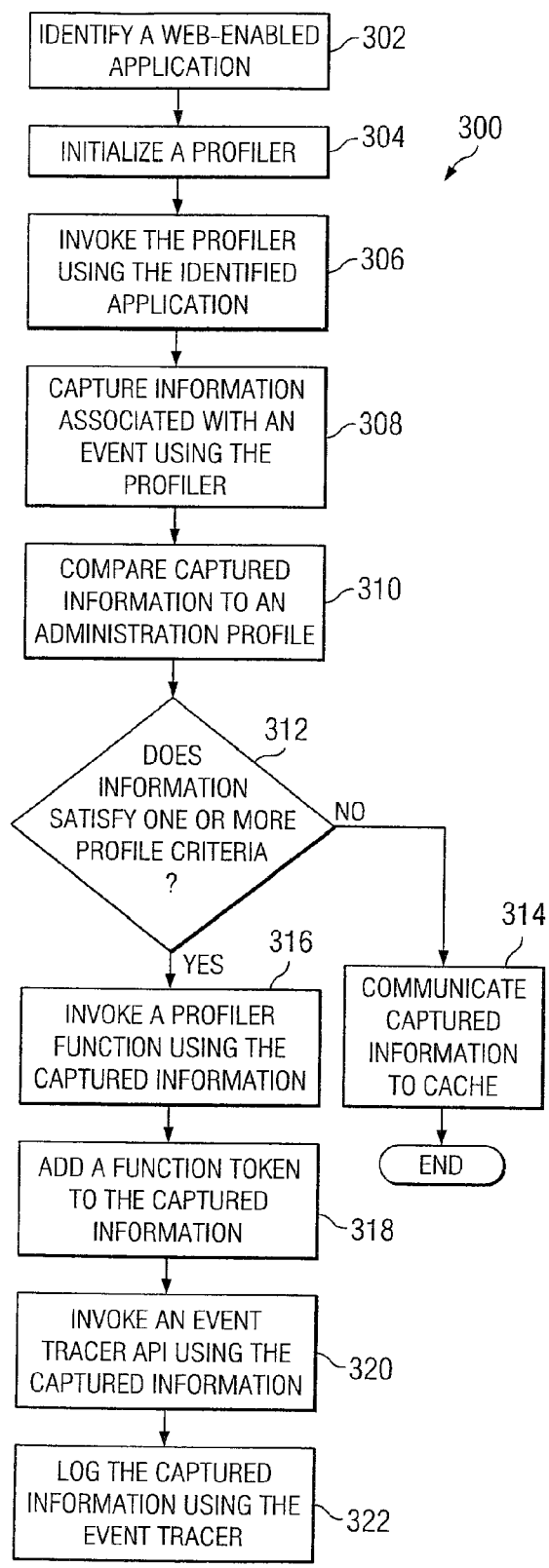
FIGS. 3A-B illustrate example methods for high-performance profiling of application events according to certain embodiments of the disclosure.
Figure 3B:
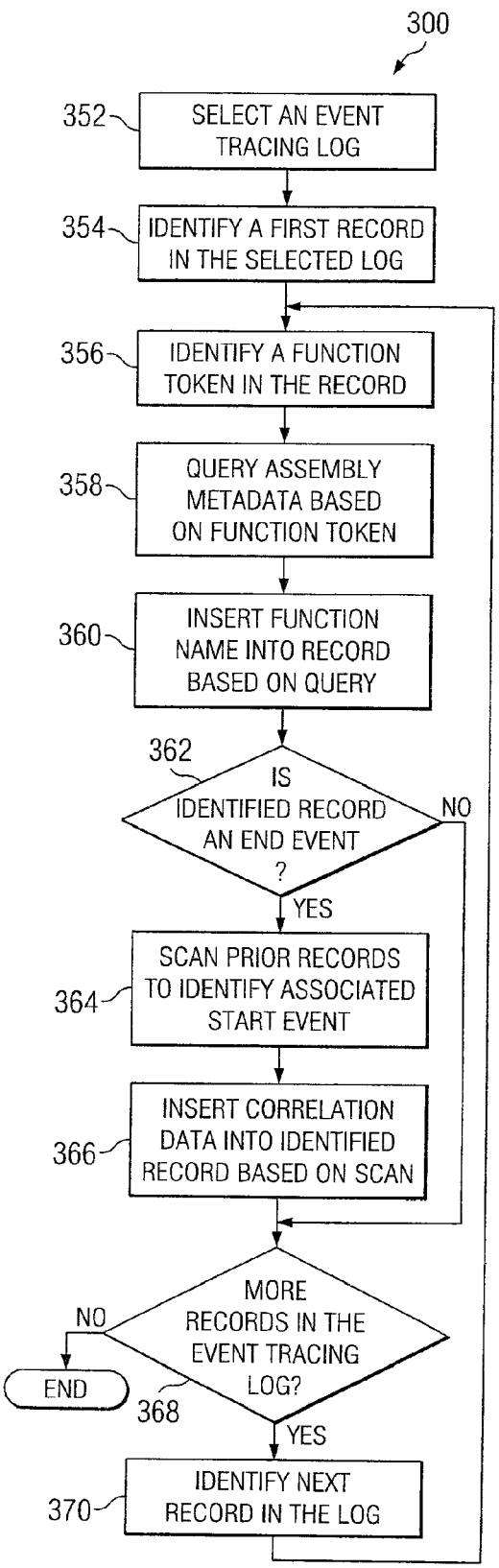

FIGS. 3A-B are flow diagrams illustrating example methods 300 and 350, respectively, for high-performance profiling of web-enabled applications 160 or a network framework (such as .NET), according to various embodiments of the disclosure. Generally, FIG. 3A illustrates method 300, which offloads logging of customizable profiling, and FIG. 3B illustrates method 350, which offloads various metadata population and correlation processes. The following descriptions focus on the operation of management engine 115 in performing methods 300 and 350. But system 100 contemplates using any appropriate combination and arrangement of logical elements implementing some or all of the described functionality.

Method 300 begins in step 302, where a web-enabled or .NET compatible application 160 is identified. As described above, this identification may occur in response to a user request or through any other suitable technique. Next, at step 304, a profiler 202 is initialized. At step 306, profiler 202 is invoked using the identified application 160 at step 306. It will be understood that the initialization and invocation of profiler 202 may occur concurrently or may occur at times separated by any appropriate time frame. Next, profiler 202 captures information associated with an event at step 308. This event is typically associated with the identified application 160. For example, the event may be "assembly load started," "assembly load ended," "method started," "method ended," and others. At step 310, management engine 115 compares the captured information to an administration profile 165. Next, at decisional step 312, management engine 115 determines if the captured information satisfies one or more criteria stored or referenced in administration profile 165. If the information does not satisfy one or more profile criteria, then management engine 115 communicates the captured information to cache 214 at step 314 and processing of this event ends. But if the information does satisfy at least one of the profile criteria, then management engine 115 invokes a profiler function using the captured information at step 316. It will be understood that management engine 115 may invoke any appropriate profiler function such as, for example, generation of a histogram. Moreover, this invocation may occur at any time without departing from the scope of this disclosure. Next, management engine 115 adds a function token to the captured information at step 318. For example, management engine 115 may perform a lookup of the appropriate function token based on a function ID stored or referenced in the captured information. Management engine 115 then invokes an event tracer 132, such as through an event tracer API, using the captured information at step 320. For example, management engine 115 may execute a TraceEvent( ) function operable to log the event. Next, at step 322, management engine 115 logs the captured information using the event tracer 132.

Once one or more events have been logged, management engine 115 may execute example method 350 to perform various offloaded profiler functions. For example, method 350 begins at step 352, where management engine 115 selects an event tracing log 170. This selection may be in response to a request from a user, dynamically based on system parameters, or automatically in response to a request from a process. Once selected, management engine 115 identifies a first record in the selected log 170 at step 354. At step 356, management engine 115 identifies a function token in the record. Next, management engine 115 identifies a function name based on the function token or function ID via, for example, one or more queries of assembly metadata based on the function token at step 358. At step 360, management engine 115 inserts a function name into the record based on the query. It will be understood that the management engine 115 may determine and insert the function name using any suitable technique. Next, at decisional step 362, management engine 115 determines the identified record as an end event. If it is, management engine 115 scans prior records to identify the associated starting event at step 364. Once located, management engine 115 inserts any suitable correlation data into the identified end record based on the scan at step 366. Once correlated (or if the identified record was not an end event), then management engine 115 determinates if there are more records in the event tracing log at decisional step 368. If there are more records, then management engine 115 identifies the next record in log 170 and processing returns to step 356. Once substantially all of the event tracing records have been suitable processed or identified, then method 350 ends.

The proceding flowcharts and accompanying description illustrate only exemplary methods 300 and 350. In short, system 100 contemplates using any suitable technique for performing these and other tasks. Accordingly, many of the steps in these flowcharts may take place simultaneously and/or in different orders than as shown. Moreover, system 100 may use methods with additional steps, fewer steps, and/or different steps, so long as the methods remain appropriate. Although this disclosure has been described in terms of certain embodiments and generally associated methods, alterations and permutations of these embodiments and methods will be apparent to those skilled in the art. For example, system 100 may use a profiler other than Microsoft's CLR profiler, so long as the profiler is operable to monitor, reference, or otherwise process information associated with a web-enabled application. Accordingly, the above description of example embodiments does not define or constrain this disclosure. Other changes, substitutions, and alterations are also possible without departing from the spirit and scope of this disclosure.

What is claimed is:

1. A method for high-performance profiling of application events, the method comprising:

using a processor, registering a profiler to provide, to an event tracer, information associated with a profiler function that the profiler implements to instrument an executing application;

capturing an event from the executing application with the profiler, wherein the profiler captures the event in response to information associated with the event satisfying a profile criterion; and offloading the profiler function implemented via the profiler from the profiler to the event tracer, wherein offloading the profiler function to the event tracer comprises:

communicating the event captured from the executing application and a function token associated with the event from the profiler to the event tracer, wherein the profiler function implemented via the profiler returns the function token associated with the event; and identifying a function name to associate with the event based on the function token returned from the profiler function implemented via the profiler.

2. The method of claim 1, further comprising:

querying assembly metadata associated with the function token returned from the profiler function implemented via the profiler to identify the function name to associate with the event; and using, the function name identified from the assembly metadata associated with the function token to populate metadata in a record in an event tracing log associated with the profiler function offloaded to the event tracer.

3. The method of claim 2, wherein the profiler function offloaded to the event tracer comprises the query to identify the function name to associate with the event.

4. The method of claim 1, wherein:
the capturing comprises capturing a plurality of events including the event from the executing application with the profiler,
the communicating comprises communicating the plurality of events and a plurality of function tokens associated with the plurality of events from the profiler to the event tracer,
the plurality of events communicated from the profiler are correlated based on identified function names associated with the plurality of events to offload the corresponding profiler functions implemented via the profiler from the profiler to the event tracer, and
correlating the plurality of events comprises:
identifying a start event among the plurality of events communicated from the profiler in response to the plurality of events communicated from the profiler including an end event; and
associating the start event with the end event in response to the function name associated with the start event matching the function name associated with the end event to correlate the plurality of events communicated from the profiler.

5. The method of claim 1, further comprising:
determining whether the profiler function implemented via the profiler is active in response to a notification message that invokes the profiler; and
executing, by the profiler, the profiler function to capture the event from the executing application, if the profiler function is determined to be active.

6. The method of claim 1, further comprising:
determining that the information associated with the event does not satisfy the profile criterion; and
storing the information associated with the event that does not satisfy the profile criterion in a cache prior to having the event tracer perform the function offloaded from the profiler on the event that does not satisfy the profile criterion.

7. A non-transitory computer-readable storage medium containing computer-executable instructions for high-performance profiling of application events, wherein executing the computer-executable instructions on a processor causes the processor to:
register a profiler to provide, to an event tracer, information associated with a profiler function implemented via the profiler to instrument an executing application;
capture an event from the executing application with the profiler in response to information associated with the event satisfying a profile criterion;
communicate the event captured from the executing application and a function token associated with the event from the profiler to the event tracer, wherein the profiler function implemented via the profiler returns the function token associated with the event; and
identify a function name to associate with the event based on the function token returned from the profiler function implemented via the profiler
to offload the profiler function implemented via the profiler from the profiler to the event tracer.

8. The non-transitory computer-readable storage medium of claim 7, wherein executing the computer-executable instructions on the processor further causes the processor to:

query assembly metadata associated with the function token returned from the profiler function implemented via the profiler to identify the function name to associate with the event events; and
use the function name identified from the assembly metadata associated with the function token to populate metadata in a record in an event tracing log associated with the profiler function offloaded to the event tracer.

9. The non-transitory computer-readable storage medium of claim 8, wherein the profiler function offloaded to the event tracer comprises the query to identify the function name to associate with the event.

10. The non-transitory computer-readable storage medium of claim 7, wherein executing the computer-executable instructions further causes processor to:
capture a plurality of events including the event from the executing application with the profiler, and communicate the plurality of events and a plurality of function tokens associated with the plurality of events from the profiler to the event tracer;
correlate the plurality of events communicated from the profiler based on identified function names associated with the plurality of events to offload the corresponding profiler functions implemented via the profiler from the profiler to the event tracer;
identify a start event among the plurality of events communicated from the profiler in response to the plurality of events communicated from the profiler including an end event; and
associate the start event with the end event in response to the function name associated with the start event matching the function name associated with the end event to correlate the plurality of events communicated from the profiler.

11. The non-transitory computer-readable storage medium of claim 7, wherein executing the computer-executable instructions on the processor further causes the processor to:
determine whether the profiler function implemented via the profiler is active in response to a notification message; and
execute the profiler function to capture the event from the executing application, if the profiler function is determined to be active.

12. The non-transitory computer-readable storage medium of claim 7, wherein executing the computer-executable instructions on the processor further causes the processor to:
determine that the information associated with the event does not satisfy the profile criterion; and
store the information associated with the event that does not satisfy the profile criterion in a cache prior to having the event tracer perform the function one or more functions offloaded from the profiler on the event that does not satisfy the profile criterion.

13. A system for high-performance profiling of application events, wherein the system comprises a hardware server comprising a processor configured to:
register a profiler to provide, to an event tracer, information associated with a profiler function implemented via the profiler to instrument an executing application;
capture an event from the executing application with the profiler in response to information associated with the event satisfying a profile criterion;
communicate the event captured from the executing application and a function token associated with the event from the profiler to the event tracer, wherein the profiler function implemented via the profiler returns the function token associated with the event; and identify a function name to associate with the event based on the function token returned from the profiler function implemented via the profiler to offload the profiler function implemented via the profiler from the profiler to the event tracer.

14. The system of claim 13, wherein the processor is further configured to:
  query assembly metadata associated with the function token returned from the profiler function implemented via the profiler to identify the function name to associate with the event; and
  use the function name identified from the assembly metadata associated with the function token to populate metadata in a record in an event tracing log associated with the profiler function offloaded to the event tracer.

15. The system of claim 14, wherein the profiler function offloaded to the event tracer comprises the query to identify the function name to associate with the event.

16. The system of claim 13 wherein the processor is further configured to:
  capture a plurality of events including the event from the executing application with the profiler, and communicate the plurality of events and a plurality of function tokens associated with the plurality of events from the profiler to the event tracer;
  correlate the plurality of events communicated from the profiler based on identified function names associated with the plurality of events to offload the corresponding profiler functions implemented via the profiler from the profiler to the event tracer;
  identify a start event among the plurality of events communicated from the profiler in response to the plurality of events communicated from the profiler including an end event; and
  associate the start event with the end event in response to the function name associated with the start event matching the function name associated with the end event to correlate the plurality of events communicated from the profiler.

17. The system of claim 13, wherein the processor is further configured to:
  determine whether the profiler function implemented via the profiler is active in response to a notification message; and
  execute the profiler function to capture the event from the executing application, if the profiler function is determined to be active.

18. The system of claim 13, wherein the processor is further configured to:
  determine that the information associated with the event does not satisfy the profile criterion; and
  store the information associated with the event that does not satisfy the profile criterion in a cache prior to having the event tracer perform the function offloaded from the profiler on the event that does not satisfy the profile criterion.

19. The system of claim 13, wherein the executing application has a namespace that associates the event captured from the executing application with the function token returned from the profiler function implemented via the profiler.

20. The method of claim 1, wherein the executing application has a namespace that associates the event captured from the executing application with the function token returned from the profiler function implemented via the profiler.

21. The non-transitory computer-readable storage medium of claim 7, wherein the executing application has a namespace that associates the event captured from the executing application with the function token returned from the profiler function implemented via the profiler.

* * * * *

UNITED STATES PATENT AND TRADEMARK OFFICE
CERTIFICATE OF CORRECTION

PATENT NO. : 8,504,674 B2  
APPLICATION NO. : 13/153630  
DATED : August 6, 2013  
INVENTOR(S) : Jeffrey A. Vaught Page 1 of 1

It is certified that error appears in the above-identified patent and that said Letters Patent is hereby corrected as shown below:

In the Claims:

Column 10, line 4 (claim 8, line 7) please change "the event events;" to -- the event; --

Column 10, line 15 (claim 10, line 3) please change "causes processor" to -- causes the processor --

Column 10, lines 51-52 (claim 12, lines 8-9) please change "function one or more functions offloaded" to -- function offloaded --

Signed and Sealed this
Twenty-ninth Day of October, 2013

Teresa Stanek Rea
*Deputy Director of the United States Patent and Trademark Office*